United States Patent [19]

Hsiao

[11] Patent Number: 5,579,146
[45] Date of Patent: Nov. 26, 1996

[54] SCANNING OPTICAL SET

[75] Inventor: Jaffe Hsiao, Hsin-Chu, Taiwan

[73] Assignee: Must Systems Inc., Taiwan

[21] Appl. No.: 516,094

[22] Filed: Aug. 17, 1995

[51] Int. Cl.$^6$ .............................. G02B 26/08; G02B 26/02
[52] U.S. Cl. ........................... 359/196; 359/227; 358/483; 250/578.1
[58] Field of Search ...................................... 359/196, 204, 359/205, 206, 227, 230; 250/208.3, 227.28, 578.1; 358/474, 296, 482–483; 347/225, 256, 258–260; 355/71

[56] References Cited

U.S. PATENT DOCUMENTS 5,420,712  5/1995  Maeda et al. ............................ 359/196

FOREIGN PATENT DOCUMENTS 0452759  10/1991  European Pat. Off. .
232398   10/1994  Taiwan ............................ G06K 9/74
235112   11/1994  Taiwan .

*Primary Examiner*—James Phan
*Attorney, Agent, or Firm*—Bacon & Thomas

[57] ABSTRACT

The present invention provides a scanning optical set used with an optical-electronic converter for providing an optical image to said optical-electronic converter to generate an electronic signal, which includes a reflective mirror set receiving said optical image for outputting, through different optical paths, a plurality of output images and a lens set, through which, said output images are focused onto said optical-electronic converter. Such scanning optical set can be used for obtaining optical resolution and scanning width for different documents.

4 Claims, 6 Drawing Sheets

SCANNING OPTICAL SET

FIELD OF THE INVENTION

The present invention relates to an optical instrument, and more particularly to a scanning optical set.

BACKGROUND OF THE INVENTION

There are two important parameters for a scanning optical equipment: highest resolution and maximum scanning width. For the same optical electronic converter (a CCD, for example), a design with a larger scanning width is obtained at the price of a lower resolution; on the other hand, to obtain higher resolution, the designer has to decrease the scanning width. Hence, to satisfy user's requirement of high resolution, manufacturers produce high resolution scanning optical equipment either with narrow scanning width or with a costly CCD that provides high resolution. On the other hand, to satisfy users' requirement of larger scanning width, manufacturers produce scanning optical equipment that has low resolution but increased scanning width. Majorities of users need to sometimes scan both high resolution pictures and wide size documents; which means that they have to own either two scanning optical equipments, one offers high resolution and one offers larger scanning width, or one scanning optical equipment which offers both but costs a lot. Thus users' financial burden is increased significantly. Hence, some manufacturers developed lens sets for scanning optical equipment. They also obtained patents for the lens sets, such as publication number 232398 for "multi-lens switching mechanism," and publication number 235112 for "multi-lens optical scanner," which as shown on FIG. 1, has a lens set 12 that is driven along a slide bar 13 by a manual driver 11; changing optical resolution is accomplished by switching to different lens this way. Referring to FIG. 2, this "multi-lens optical scanner" has a motor 21 that drives a reduction gear assembly 22 which, in turn, moves the gear rack 23 and the lens set 24 to change lens and optical resolution. In optical scanning equipment, the relative position of elements is critical; a slight misaligmnent shall result in blurred images. The shortcoming of aforementioned "multi-lens optical scanner" is its difficulty in being aligned accurately. References:

1. R. O. C. Patent No. 232398 issued to Huang on Oct. 11, 1994.
2. R. O. C. Patent No. 235112 issued to Ma on Nov. 21, 1994.

SUMMARY OF THE INVENTION

The present invention is a scanning optical set. It is used with a scanning optical equipment; it satisfies with the need of requiting an optimal resolution and an optimal scanning width for different kinds of documents to cut user's cost.

The present invention is a scanning optical set providing an optical image to an optical-electronic converter to generate an electronic signal and includes a reflective mirror set receiving said optical image for outputting, through different optical paths, a plurality of output images, and a lens set, through which, said output images are focused onto said optical-electronic converter.

The optical-electronic converter could preferably be a charge-coupled device which converts an input signal to an output analog electronic signal.

A blocking apparatus is preferably installed between said CCD and lens set to be used to block all but one of said output images from reaching said CCD.

The blocking apparatus is preferably controlled by a control unit. The scanning optical set is preferably used with a scanning optical equipment, and further preferably includes a housing inside which said mirror set and lens set are installed.

The housing is preferably used as a fixture to attach said scanning optical set in said scanning optical equipment. The present invention may best be understood through the following description with reference to the accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purpose of illustration and description only; it is not intended to be exhaustive or to be limited to the precise form disclosed.

Figure 1:
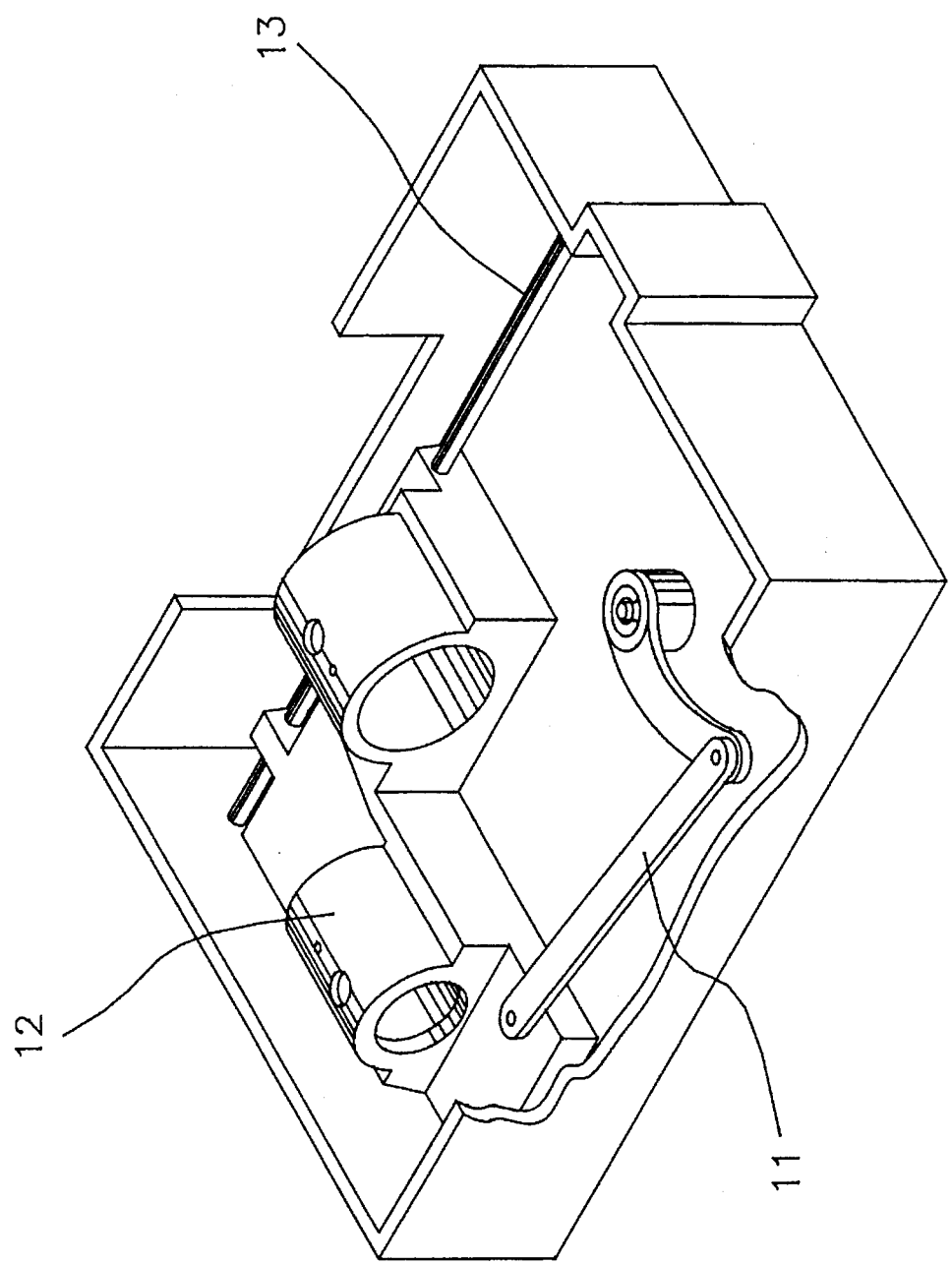
FIG. 1 shows a multi-lens switching mechanism for a conventional scanning optical equipment.
Figure 2:
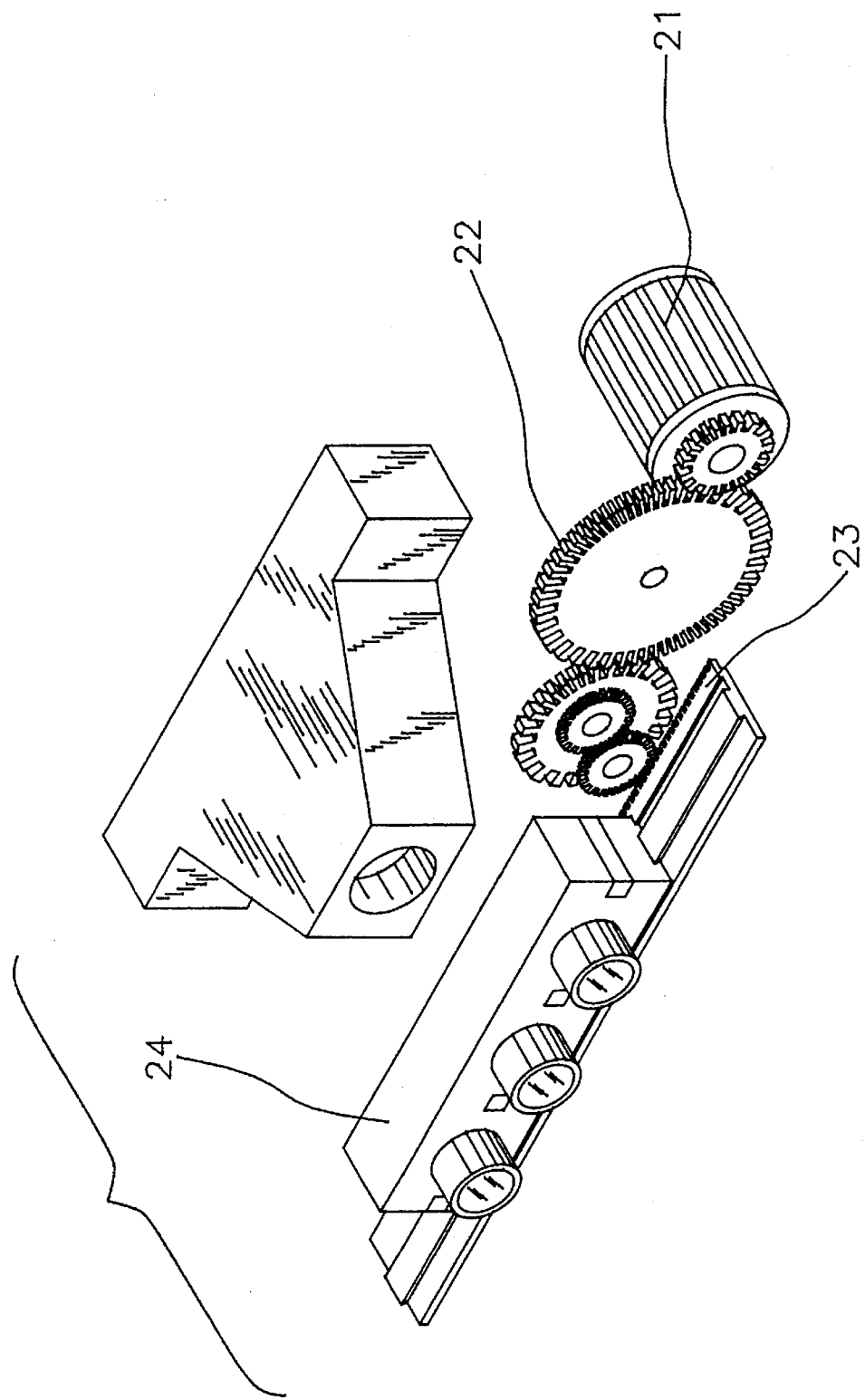
FIG. 2 shows another multi-lens switching mechanism for a conventional scanning optical equipment.
Figure 3:
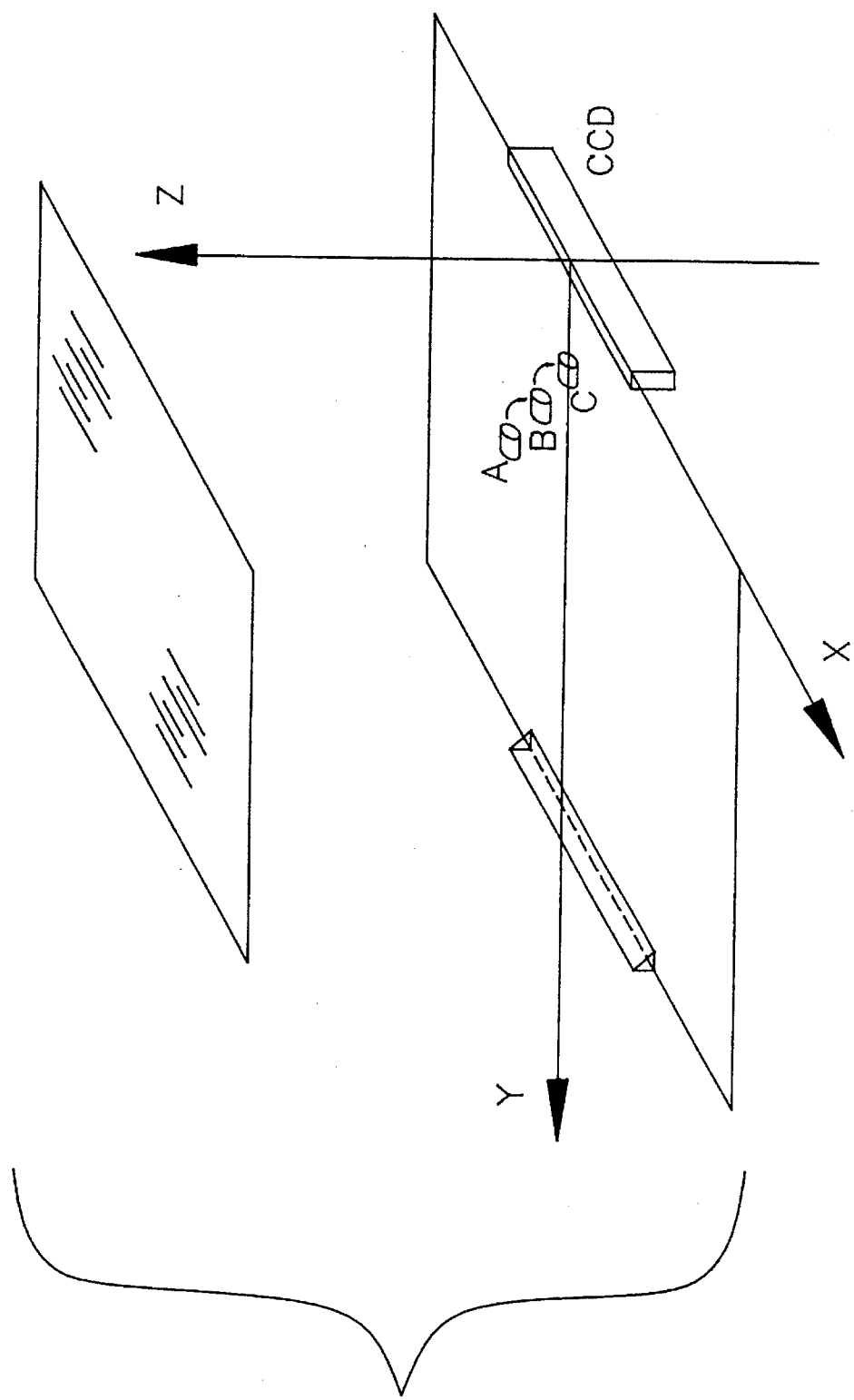
FIG. 3 is a schematic view showing a conventional multi-lens switching mechanism used in a scanning optical equipment.
Figure 4:
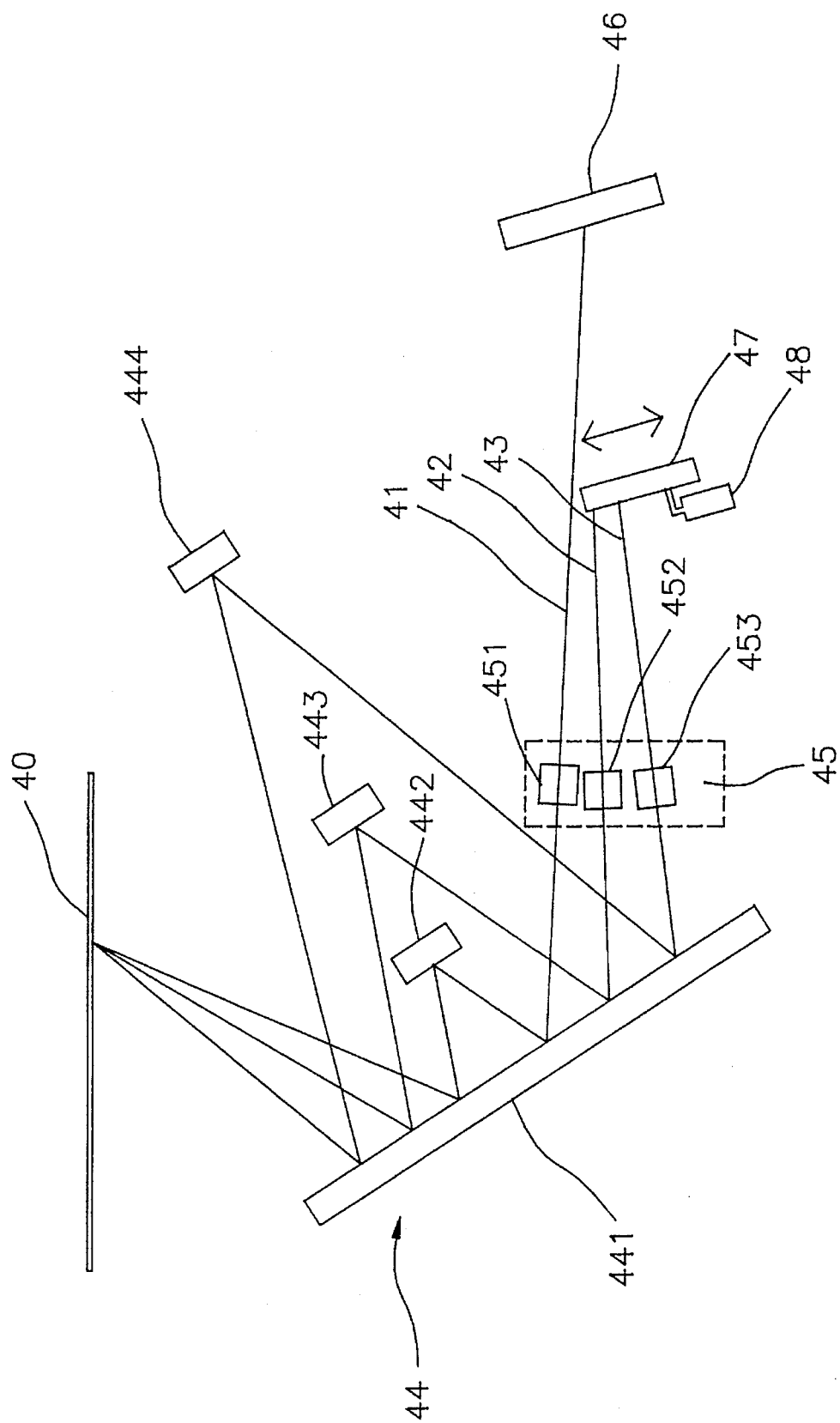
FIG. 4 is a top view of a preferred embodiment of a scanning optical set according to the present invention used in a scanning optical equipment.

Please refer to FIG. 4, which shows an object 40, a reflective mirror set 44, and a lens set 45. The reflective mirror set includes mirrors 441, 442, 443 and 444. The lens set includes lens 451, 452 and 453. Three optical paths are illustrated. They are 41, 42 and 43.

Optical path 41 is constructed as follows: the optical signal of the image starting from the object 40 is reflected by mirrors 441 and 442, passes through lens 451, and finally arrives at the optical-electronic converter 46 which could be a charge-coupled device (CCD);

Optical path 42 passes from object 40, through mirror 441, mirror 443 and lens 452, to CCD 46;

Optical path 43 passes from object 40, through mirror 441, mirror 44 and lens 453, to said CCD 46.

A blocking apparatus 47 may be installed anywhere along the optical paths; in this preferred embodiment, it is installed between lens set 45 and CCD 46. Said blocking apparatus 47, controlled by a control unit 48, blocks all but one of images passing along optical paths 41, 42 and 43 from reaching said CCD 46. (In FIG. 4, images passing along optical paths 42 and 43 are blocked.)

Figure 5:
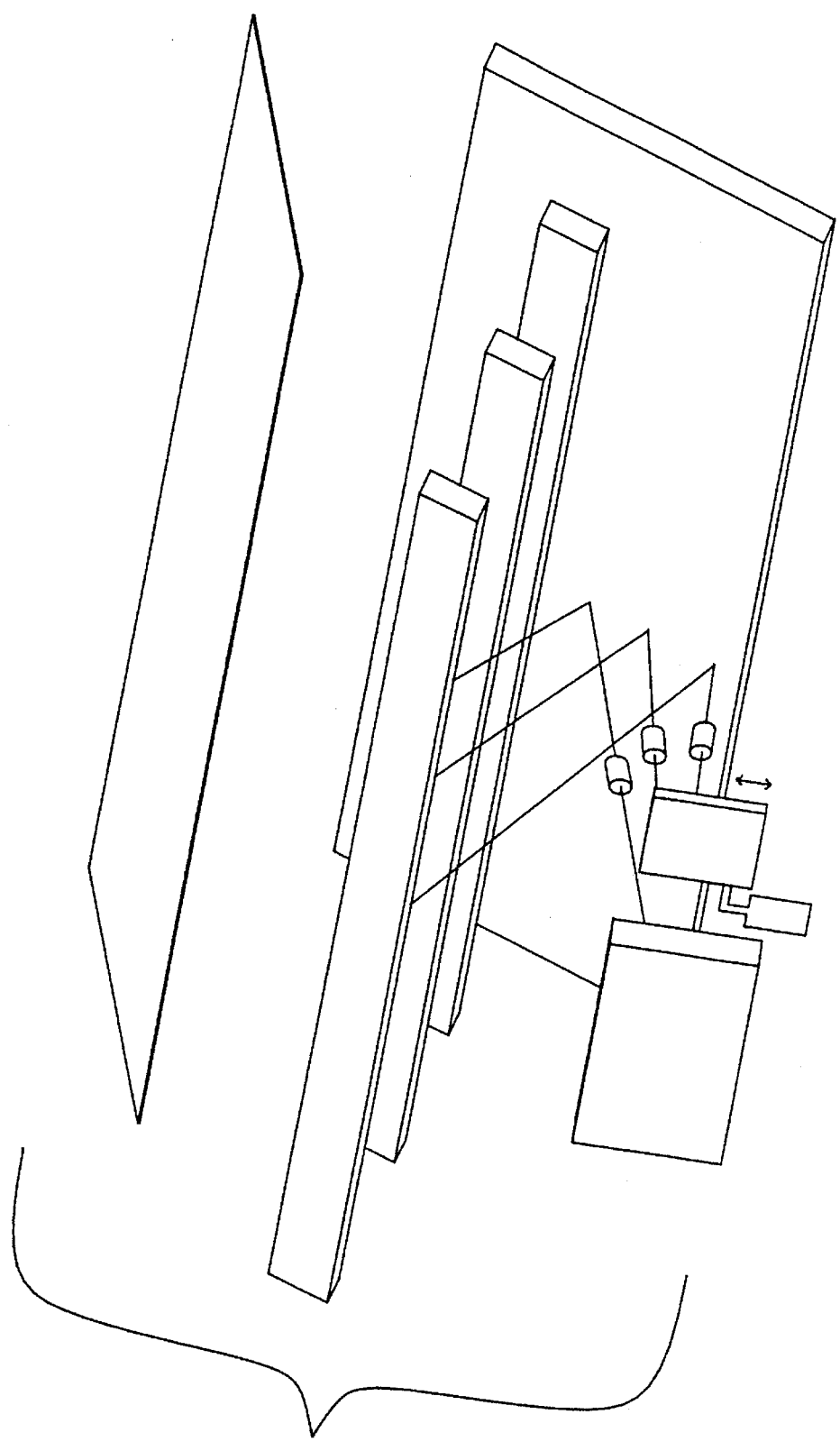
FIG. 5 is a schematically perspective view of a preferred embodiment of a scanning optical set according to the present invention used in a scanning optical equipment.

FIG. 5 is a schematically perspective view corresponding to FIG. 4.

Figure 6:
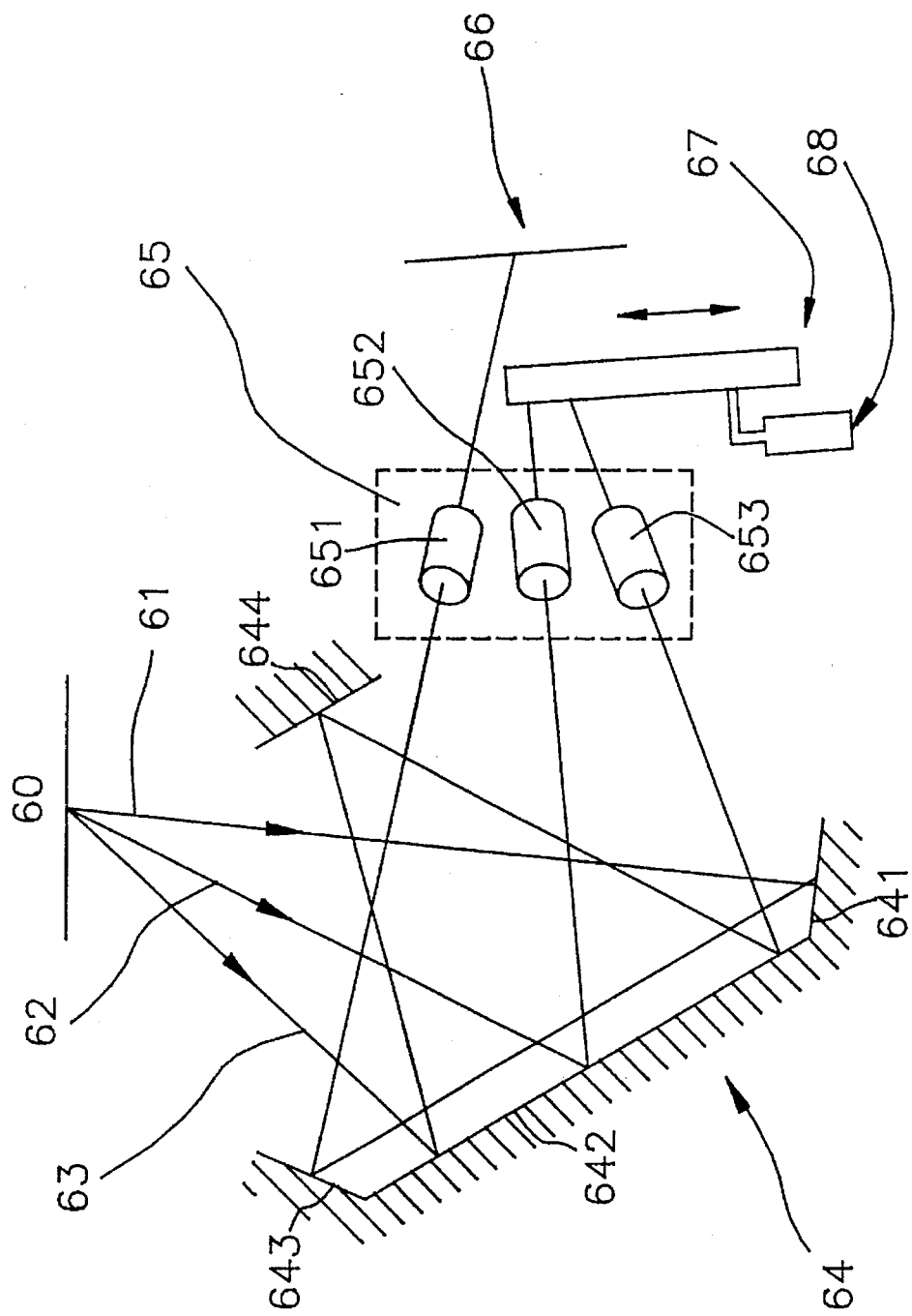
FIG. 6 is a top view of a further preferred embodiment of a scanning optical set according to the present invention used in a scanning optical equipment.

FIG. 6 illustrates another preferred embodiment of a scanning optical set according to the present invention. There are three optical paths in this embodiment:

Optical path 61 passes from the object 60, through the mirror 641, the mirror 643 and the lens 651, to the CCD 66;

Optical path 62 passes from the object 60, through the mirror 642, and the lens 652 to the CCD 66;

Optical path 63 passes from object 60, through mirror 642, the mirror 644, mirror 642 and the lens 653, to the CCD 66;

In this preferred embodiment, the blocking apparatus 67 and control unit 68 function in the same manner as blocking apparatus 47 and control unit 48 illustrated in FIG. 4.

Due to nature of the design, all parts in the optical paths of the present invention, once selected and adjusted properly, do not need to be moved; thus incurring fewer problems related to position tolerance; besides, the present invention uses a set of fixed, standard parts, parts purchase is a simple and straightforward procedure rather than a complicated one.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A scanning optical set adapted to be used with an optical-electronic converter for providing an optical image to said optical-electronic converter to generate an electronic signal comprising:

a reflective mirror set for receiving said optical image and for outputting, through different optical paths, a plurality of output images;

a lens set, through which said output images are focused onto said optical-electronic converter; and a blocking apparatus installed between said optical-electronic converter and said lens set for blocking at least one of said plurality of output images from reaching said optical converter.

2. A scanning optical set as claimed in claim 1 wherein said optical-electronic converter is a charge-coupled device (CCD) which converts said optical image into said electronic signal.

3. A scanning optical set as claimed in claim 1, wherein said blocking apparatus installed between said optical-electronic converter and said lens set is used for blocking all but one of said output images from reaching said optical-electronic converter.

4. A scanning optical set as claimed in claim 3 wherein said blocking apparatus is controlled by a control unit.

* * * * *